United States Patent [19]
Johns et al.

[11] Patent Number: 4,631,138
[45] Date of Patent: Dec. 23, 1986

[54] CORROSION INHIBITORS

[75] Inventors: Marshall E. Johns, Creve Coeur; Keith D. Strassner; Thomas G. Braga, both of St. Louis, all of Mo.

[73] Assignee: Petrolite Corporation, St. Louis, Mo.

[21] Appl. No.: 699,390

[22] Filed: Feb. 7, 1985

[51] Int. Cl.$^4$ .................... C23F 11/04; C23F 11/14; C23F 11/16
[52] U.S. Cl. ................................ 252/8.555; 252/391; 252/392; 252/8.554; 422/7; 422/12; 422/16
[58] Field of Search .......... 252/391, 392, 394, 8.55 E, 252/8.55 D; 422/7, 12, 16

[56] References Cited

U.S. PATENT DOCUMENTS

| 2,304,624 | 12/1942 | Burke | 564/59 X |
| 2,618,605 | 11/1952 | Schaeffer | 252/392 X |
| 2,640,029 | 5/1953 | Blair et al. | 252/8.55 |
| 3,488,294 | 1/1970 | Annand et al. | 252/391 |
| 4,235,838 | 11/1980 | Redmore et al. | 252/391 X |
| 4,332,799 | 6/1982 | Quinlan | 252/8.55 X |
| 4,446,056 | 5/1984 | Thompson | 252/391 |

Primary Examiner—Herbert B. Guynn
Attorney, Agent, or Firm—Robert E. Wexler

[57] ABSTRACT

Triazones and triazine thiones are disclosed as corrosion inhibitors for ferrous metals.

13 Claims, No Drawings

CORROSION INHIBITORS

FIELD OF THE INVENTION

This invention relates to corrosion of ferrous metals in oil and gas well drilling, production and storage systems. In particular the invention relates to corrosion inhibitors for such systems, specifically the use of triazones and triazine thiones as corrosion inhibitors in such systems and, particularly, as corrosion inhibitors in water flood systems.

Corrosion of metals in oil and gas well drilling and production systems is a serious problem since the normal corrosive action of injected and produced waters is exacerbated by the presence of $H_2S$, $O_2$, $CO_2$, organic and inorganic acids and brine. The resulting corrosion is rapid.

Although many substances have been developed over the years to inhibit corrosion in drilling, production and storage systems, there is a continuing need for new corrosion inhibitors.

In the context of the present invention, the terms "oil well drilling, production and storage system" and "gas well drilling, production and storage system" encompass all of the corrosion-prone tubing and equipment used in drilling, producing and storing of oil and gas from subterranean earth formations, including the corrosion induced by the use of injected or produced waters in secondary and tertiary recovery methods, e.g. water floods and the like.

PRIOR ART

U.S. Pat. No. 2,304,624 discloses the preparation of triazones and triazine thiones and their utility in the preparation of pesticides, lubricity improvers, drugs and rubber accelerators.

SUMMARY OF THE INVENTION

In accordance with the present invention, it has been found that solutions, dispersions and emulsions of triazones, triazine thiones and acid salts thereof, in suitable carriers or solvents, are excellent corrosion inhibitors. Accordingly, the present invention relates to the use of such compounds, and compositions containing same, in a method for inhibiting corrosion of ferrous metals in the general environment and, especially, in the environment of oil and gas well drilling, production and storage systems.

DETAILED DISCLOSURE OF THE INVENTION

The compounds used in the method of the invention are triazones and triazine thiones represented by the formula

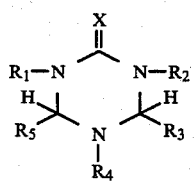

wherein X represents O or S, $R_1$ and $R_2$ are the same or different and $R_3$ and $R_5$ are the same and represent hydrogen, alkyl, cycloalkyl, aryl, aralkyl, alkaryl, and heterocyclyl and $NR_4$ represents a primary amine moiety wherein $R_4$ represents an organic radical.

In the definition of $R_1$, $R_2$, $R_3$ and $R_5$, representative alkyl groups include branched or unbranched alkyl groups containing from 1 to about 30 carbon atoms or more, for example, methyl, ethyl, propyl, butyl, amyl, hexyl, heptyl, octyl, nonyl, decyl, dodecyl, tetradecyl, hexadecyl, octadecyl, eicosyl, pentacosyl, triacontyl and the like, which groups may be substituted;

Representative cycloalkyl groups include such groups containing from 3 to 8 carbon atoms, for example, cyclopropyl, cyclobutyl, cyclopentyl, cyclohexyl, cycloheptyl, cyclooctyl and the like, which groups may be substituted;

Representative aryl groups, whether singly or in fused ring systems, include for example, phenyl, biphenyl, naphthyl and the like, which groups may be substituted;

Representative aralkyl groups include, for example, benzyl, phenylethyl, phenylhexyl, phenyloctyl, phenyldodecyl, naphthyldecyl, phenylheptadecyl and the like, which groups may be substituted;

Representative alkaryl groups include, for example, methylphenyl, propylphenyl, styryl and the like, which groups may be substituted;

Representative heterocyclyl groups include, for example, furanyl, thiothiophenyl, pyrryl, oxazolyl, thiazolyl, thiazolinyl, thiazolidinyl, pyrazolyl, imidazolyl, pyranyl, pyridinyl, oxazinyl, diazinyl and the like, which groups may be substituted;

Examples of organic radicals represented by $R_4$ include:

(1) branched or unbranched alkyl groups containing from 1 to about 30 carbon atoms or more, for example, methyl, ethyl, propyl, butyl, amyl, hexyl, heptyl, octyl, nonyl, decyl, dodecyl, tetradecyl, hexadecyl, octadecyl, eicosyl, pentacosyl, triacontyl and the like, which groups may be substituted;

(2) cycloalkyl groups containing from 3 to 8 carbon atoms, for example, cyclopropyl, cyclobutyl, cyclopentyl, cyclohexyl, cycloheptyl, cyclooctyl and the like, which groups may be substituted;

(3) branched or unbranched alkenyl groups containing from 1 to about 30 carbon atoms or more, for example, ethenyl, propenyl, butenyl, pentenyl, hexenyl, heptenyl, octenyl, nonenyl, decenyl, dodecenyl, pentadecenyl, eicosenyl, triacontenyl, butadienyl, allyl and the like, which groups may be substituted;

(4) branched or unbranched alkinyl groups containing from 1 to about 30 carbon atoms or more, for example, ethinyl, propinyl, butinyl, pentinyl, hexinyl, heptinyl, octinyl, noninyl, decinyl, dodecinyl, pentadecinyl, eicosinyl, triacontinyl and the like, which groups may be substituted;

(5) aryl groups, whether singly or in fused ring systems, for example, phenyl, biphenyl, naphthyl and the like, which groups may be substituted;

(6) aralkyl groups, for example, benzyl, phenylethyl, phenylhexyl, phenyloctyl, phenyldodecyl, naphthyldecyl, phenylheptadecyl and the like, which groups may be substituted;

(7) alkaryl groups, for example methylphenyl, propylphenyl, styryl and the like, which groups may be substituted;

(8) heterocyclyl groups, for example, furanyl, thiophenyl, pyrryl, isozazolyl, oxazolyl, thiazolyl, thiazolinyl, thiazolidinyl, pyrazolyl, imidazolyl, pyranyl, pyridinyl, oxazinyl, diazinyl and the like, which groups may be substituted;

(9) condensed ring groups, for example, indyl, anthracyl, phenanthryl and the like, which groups may be substituted;

(10) carboxyl groups, e.g., —C(=O)OR$_1$ and derivatives thereof such as the esters, ethers, alkali metal and ammonium salts and the like; —C(=O)SR$_1$ and similar derivatives thereof; —C(=S)OR$_1$ and similar derivatives thereof; and —C(=S)SR$_1$, wherein R$_1$ is defined above. Such groups may be further substituted as described below.

The definition of R$_4$, above, is intended to illustrate that such definition is meant to be very broad, as will be further discussed regarding the preparation of the compounds utilized in the method of the invention.

Wherein it is indicated that the above-described groups may be substituted, it is contemplated that the substituents may be hydrocarbyl, e.g. alkyl, cycloalkyl, alkenyl, alkinyl, aryl, aralkyl, alkaryl, or may be heterocyclyl as described above in detail or may be halo, e.g. chloro, fluoro, bromo; HOR$_1$—, wherein R$_1$ is defined above;

wherein R$_1$ is defined above; amino, amido, acetamido, benzamido, carbonyl, cyano, cyanato, nitro, nitroso, sulfonyl, sulfonamide, benzenesulfonyl, benzenesulfonamido, thiol, phospho, phosphono, phosphoro, phosphonamido and the like.

The characteristics of R$_1$, R$_2$, R$_3$, R$_4$ and R$_5$, individually and collectively, affect the solubility, dispersability and emulsibility of 1,3,5-triazine-2(1H)-thiones and 1,3,5-triazones. For example, substituents which include hydrophilic functionalities such as —OH, —N(R)H, —NH$_2$, —SH and the like, tend to enhance solubility in polar solvents such as water and alcohols, with the effect being more pronounced as molecular weight decreases. Substituents which are inherently hydrophobic, such as hydrocarbons, tend to enhance solubility in nonpolar solvents, e.g. hydrocarbons, with the effect being more pronounced as molecular weight increases, even though other groups may be present. Mineral acid and low molecular weight salts of ionic functionalities, especially in R$_4$, tend to increase solubility in polar solvents.

The compounds used in the method of the invention are known in the art and are prepared by the method described in U.S. Pat. No. 2,304,624, wherein a primary amine is added to a solution of dimethylolurea or dimethylolthiourea, or wherein an aldehyde, a urea or thiourea and a primary amine are reacted in any order. As illustrated herein, the compounds are conveniently prepared by reaction of an aldehyde, a urea or thiourea and a primary amine. The primary amine contributes the nitrogen in the triazone or triazine thione molecule to which R$_4$ is attached. In general, the amine is added to a mixture of aldehyde and urea, heated to a temperature of from about 45° to about 85° C., stirred for about ½ to 4 hours and cooled to about 0°–15° C.

The primary amines used in preparing the compounds useful herein include any compound which contains at least one primary amino group and which is free from a group which is as reactive with an aldehyde, a thiourea or a urea as is the amino group—thus the previous broad definition of R$_4$. This restriction is necessary to prevent any competition with the aminoaldehyde/thiourea/urea reaction necessary to afford the above-described compounds. Exemplary primary amines include methylamine, diethylamine, propylamine, t-butylamine, octylamine, octadecylamine, benzylamine, cyclohexylamine, propenylamine, oleylamine, furfurylamine, dimethylaminoethylamine, ethylenediamine, tetramethylenediamine, hexamethylenediamine, octinylamine, 1-naphthylamine, styrylamine, 4-pyridylamine and the like, which amines may be further substituted with groups such as phenyl, alkoxy, hydroxyalkyl, chloro and the like e.g. hydroxyethylamine, hydroxypropylamine, glycine, polyoxyethyleneamines and the like such as amines which have been oxyalkylated with such agents as ethylene oxide, propylene oxide or butylene oxide sequentially or as mixtures thereof.

Any aldehyde is useful in the preparation of the compounds used herein. Exemplary aldehydes include formaldehyde, acetaldehyde, butyraldehyde, furfuraldehyde, heptaldehyde, benzaldehyde, phenyl acetaldehyde and the like. In terms of greatest yield of desired compound, the lower aldehydes, e.g. formaldehyde and acetaldehyde, are preferred.

Exemplary ureas or thioureas useful in the preparation of the compounds used herein include any urea or thiourea having a hydrogen atom on each amide nitrogen, thus N-mono- and N,N'-di-substituted ureas, and corresponding thioureas, such as nitroethylurea, methoxyethylurea, methylurea, phenylurea, chlorophenylurea, N,N'-diethylurea, butylurea, β-dimethylaminourea, N-methyl-N'cyclohexylurea, N-ethyl-N'-octylurea, N-methyl-N'-naphthylurea and the like.

Acid and quaternary ammonium salts of the above-described compounds are especially useful in the method of the invention and are prepared by simple reaction of the triazone or triazine thione with a desired acid or alkyl halide. Thus, the triazone or triazine thione, which contains a basic nitrogen, is reacted with acetic acid to form the acetate salt or with sulfonic acid, phosphonic acid, phosphoric acid, hydrochloric acid, sulfinic acid, nitric acid and the like to form the corresponding salt. Acid salts may be prepared by reaction with any acid which will react with a basic nitrogen. Quaternary ammonium salts are prepared by reaction with an alkyl halide such as methyl chloride or other known quaternizing agent.

Of the compounds described herein, most desirable are the triazine thiones and acid salts thereof.

The following Table illustrates substituents represented by R$_1$, R$_2$, R$_3$, R$_4$ and R$_5$ and exemplary compounds which may be prepared in accordance with the invention:

TABLE $$\begin{array}{c} X \\ \| \\ R_1\diagdown N \diagup C \diagdown N \diagup R_2 \\ H\diagdown | \quad \quad | \diagup H \\ R_5 \diagup \quad N \quad \diagdown R_3 \\ | \\ R_4 \end{array}$$

X = O or S

| $R_1$ | $R_2$ | $R_3, R_5$ | $R_4$ |
|---|---|---|---|
| —H | —H | —H | —$CH_3$ |
| —H | —H | —H | —$CH_2CH_2CH_3$ |
| —$CH_3$ | —$CH_3$ | —H | —(t-butyl) |
| —H | —H | —H | —$CH_2CH_2ON$ |
| —phenyl | —H | —H | —$CH_2COOH$ |
| —H | —H | —H | —$CH_2CH_2$— |
| —H | —H | —H | —$CH_2CH_2NHCH_2CH_2CH_3COO^{\ominus}$ |
| —n-butyl | —n-butyl | —H | —$CH_2CH_2NHCH_2CH_2NHCH_2CH_2$— |
| —$CH(CH_3)_2$ | —$CH(CH_3)_2$ | —$CH_3$ | —cyclohexyl |
| —cyclohexyl | —cyclohexyl | —$CH_3$ | —(4-hydroxycyclohexane) |
| —(1-naphthyl) | —H | —$CH_3$ | —$CH_2CH=CH_2$ |
| —H | —H | —H | —oleyl |
| —(4-ethylphenyl) | —H | —$CH_3$ | —octinyl |
| —(4-pyridyl) | —H | —$CH_2CH_3$ | —phenyl |
| —benzyl | —benzyl | —$CH_2CH_3$ | —(4-chlorophenyl) |
| —phenyl | —H | —$CH_2CH_3$ | —(1-naphthyl) |
| —phenyl | —phenyl | —H | —benzyl |
| —H | —H | —(2-furfuryl) | —(p-hydroxyphenethyl) |
| —t-butyl | —H | —$CH_3$ | —styrl |
| —H | —H | —benzyl | —(2-furfuryl) |
| —$CH_2CH=CH_2$ | —H | —H | —(1-anthracyl) |
| —cyclohexyl | —(2-morpholinoethyl) | —CH—$CH_2$ | —$CH_2CH_2COOCH_3$ |
| —methyllyl | —$CH_3$ | —phenyl | —$CH_2CH_2NHCH_2CH_2NHCH_2CH_2.2HCl$ |
| —$CH_2CH_3$ | —H | —H | —$CH_2CH_2$—O—$(CH_2)_{10}CH_3$ |
| —H | —H | —H | —(4-pyridyl) |
| —H | —H | —H | —$CH_2CH_2NHCH_2CH_2OH$ |
| —H | —H | —H | —$(CH_2CH_2O)_n$—$CH_2$<br>\|<br>—$(CH_2CH_2O)_n$—$C_3$—$CH_3$<br>\|<br>—$(CH_2CH_2O)_n$—$CH_2$ |

The following examples illustrate specific embodiments of the invention and the best mode of practice thereof but are not to be considered as limiting the scope of the invention.

EXAMPLE 1

Preparation of 5-(2-Hydroxyethyl)-1,3,5-triazine-2(1H)thione

At ambient temperature, ethanolamine was added to a mixture of thiourea and 37% aqueous formaldehyde in a molar ratio of 1:1:2. The mixture was heated to 70° C., stirred for two hours and cooled, affording a precipitate which was identified as the title compound. The corresponding triazone is prepared in the same manner, substituting urea for thiourea.

EXAMPLE 2

Preparation of Salts of 5-(2-Hydroxyethyl)-1,3,5-triazine-2(1H)thione

The triazine thione of Example 1 is reacted at ambient temperature with phosphoric acid to afford the phosphate salt. Similarly, the compound of Example 1 is reacted with methyl chloride to afford the quaternary ammonium salt.

EXAMPLE 3

Preparation of 2,2'Bis(1,3,5-triazine-2(1H)thione-5-yl)-diethyl amine

At ambient temperature, diethylenetriamine was added to a mixture of thiourea and formaldehyde in a molar ratio of 1:2:0.5. The mixture was heated to 70° C., stirred for two hours and cooled, affording the title compound.

EXAMPLE 4

Preparation of Acetate Salt of 2,2'Bis(1,3,5-triazine-2(1H)thione-5-yl)-diethyl amine The compound of Example 3 was reacted at ambient temperature with 0.5 molar equivalents of acetic acid to afford the acetate salt.

EXAMPLE 5

Corrosion Protection

The compound of Example 1 was formulated as a 20% by weight solution in water. An amount of 25 ppm (parts per million) of the solution was added to 12,000 TDS (Total Dissolved Solids) brine sparged (saturated) with carbon dioxide. This 5 ppm concentration of the compound of Example 1 reduced general corrosion of AISI 1018 steel coupons to 1 mpy (mils per year) and pitting corrosion to 41 mpy from uninhibited (blank) corrosion rates of 36 and 720 mpy, respectively. This represents a 97.2% reduction in general corrosion and a 94.3% reduction in pitting corrosion.

EXAMPLE 6

Corrosion Protection

The compound of Example 4 (12.6 ppm) was added to a water injection system stream to which AISI 1018 steel coupons were exposed. The process stream was composed of aqueous brine containing 0.1–0.2 ppm oxygen, 130–150 ppm $CO_2$ and 15–20 ppm hydrogen sulfide. The compound reduced the rate of general corrosion to 7.8 mpy from the uninhibited (blank) rate of 25 mpy (68.8% reduction in general corrosion).

The same compound (10 ppm) tested in the laboratory in 70,000 TDS brine containing 0.2 ppm oxygen and 17 ppm hydrogen sulfide reduced the general corrosion rate of AISI 1018 steel coupons to 3.1 mpy from the uninhibited rate of 13.1 mpy, a reduction of 76.3%.

Similarly, the same compound, at a concentration of 8 ppm, added to brine containing $CO_2$ (saturated) reduced the general corrosion rate to 1 mpy and the pitting rate to 48 mpy from uninhibited rates of 25 mpy and 500 mpy, respectively, a reduction of 96 and 90.4%, respectively.

EXAMPLE 7

Preparation of 5-(2-octadecyl)-1,3,5-triazine-2(1H)thione

Thiourea (0.5 mole), formaldehyde (1 mole of 37% aqueous solution) and 200 ml. dioxane were placed in a 1 l. round bottom flask equipped with a stirrer. Octadecylamine (0.5 mole) was dissolved in 500 ml. dioxane and added to the thiourea/formaldehyde solution. The mixture was warmed slowly until it formed a waxy mass. It was cooled, filtered and extracted with methanol to afford the title compound as a white, fluffy material.

EXAMPLE 8

Preparation of 5-(2-hydroxypropyl)-1,3,5-triazine-2(1H)thione

In accordance with the procedure of Example 1, thiourea, formaldehyde (37% aqueous) and 1-amino-2-propanol were reacted in a molar ratio of 3:6:3 to afford the title compound.

EXAMPLE 9

Preparation of 5-(2-octyl, nonyl, decyl ethers of n-propylamine)-1,3,5-triazine-2(1H)thione Thiourea (0.5 mole), formaldehyde (1 mole, 37% aqueous) and 100 ml. methanol were charged to a 500 ml., 3-necked flask equipped with a stirrer, thermometer and addition funnel. The flask was cooled in an ice water bath and 0.5 mole of the mixed octyl, nonyl and decyl ethers of propylamine, i.e. $H_2NCH_2CH_2CH_2O(C_8-C_{10})$, was added dropwise, maintaining the temperature at about 15° C. When addition was complete, the water bath was removed and the reaction mixture was stirred at room temperature overnight, affording a white solid which, when washed, filtered and dried under vacuum, afforded the title compound.

As described in Example 1, the corresponding triazones are prepared by the substitution of above-described reactions.

It is contemplated that any of the compounds described herein, as in the Table, would have an order of effectiveness as described above for the compounds of Examples 1 and 2. Additionally the compounds described herein may be formulated into compositions containing other corrosion inhibitors, bactericides, scale preventives, algaecides, emulsifiers, demulsifiers, water and other solvents or diluents, e.g. hydrocarbons, alcohols and the like. A typical composition would comprise a triazine thione or triazone, emulsifier, water and alcohol. In another application, such composition could also contain a bactericide, an algaecide and a scale preventive.

The method of this invention relates to the use of the described compositions in inhibiting the corrosion of metals, most particularly iron, steel and ferrous alloys. These compositions can be used in a wide variety of applications and systems where iron, steel and other ferrous alloys are affected by corrosion. They may be employed for inhibiting corrosion in processes which require a protective or passivating coating, as by dissolution in the medium which comes in contact with the metal. They can be used in preventing atmospheric corrosion, underwater corrosion, corrosion in steam and hot water systems, corrosion in chemical industries, underground corrosion and the like.

The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. These inhibitors may, however, be used in other systems or applications. They appear to possess properties which impart to metals resistance to attack by a variety of corrosive agents, such as brines, dilute inorganic acids, organic acids, $CO_2$, $H_2S$, $O_2$ and the like.

The method of carrying out this process is relatively simple in principle. The corrosion inhibitor is dissolved in the liquid corrosive medium in small amounts and is thus kept in contact with the metal surface to be protected. Alternatively, the corrosion inhibitor may be applied first to the metal surface either as is, or as a solution, dispersion or emulsion in a carrier liquid or paste. Continuous application is preferred.

The present process finds particular utility in the protection of metal equipment of oil and gas wells, especially those containing or producing an acidic constituent such as $H_2S$, $CO_2$, organic and inorganic acids and the like. For the protection of such wells, the reagent, either undiluted or dissolved, dispersed or emulsified in water or a suitable carrier is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be pumped periodically (e.g., once every day or two) into the annulus. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This occurs, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well. For injection into the well annulus, the corrosion inhibitor is usually employed as a solution in a suitable solvent or dispersed or emulsified in a suitable diluent or carrier. The selection of solvent or diluent will depend much upon the exact reagent being used and its solubility characteristics.

For treating wells with packed-off tubing, the use of solid "sticks" or "plugs" of inhibitor is especially convenient. These may be prepared by blending the inhibitor with a mineral wax, asphalt or resin in a proportion sufficient to give a moderately hard and high-melting solid which can be handled and fed into the well conveniently.

The protective action of the herein-described inhibitors appears to be maintained for an appreciable time after treatment ceases, but eventually is lost unless another application is made.

For the protection of gas wells and gas-condensate wells, the amount of corrosion inhibitor required will be within range of one-half to 3 lbs. per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

These compositions are particularly effective in the prevention of corrosion in systems containing a corrosive aqueous medium, and most particularly, in systems containing brines.

These compositions can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention in sufficient amounts to prevent the corrosion of metals employed in such operation.

When an oil well ceases to flow by the natural pressure in the formation, and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of aqueous systems, it is necessary to prevent or reduce corrosion since corrosion increases cost by making it necessary to repair and replace equipment at frequent intervals.

In accordance with the present invention, there has been discovered an improved process of inhibiting corrosion of metallic equipment in secondary oil recovery by water flooding, such as injection wells, transmission lines, filters, meters, storage tanks and other metallic elements employed therein, and particularly equipment containing iron, steel, and other ferrous alloys, such process being characterized by employing, in water flood operations, a normally aqueous or alcohol solution of the compositions of this invention.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analagous to those encountered in the secondary recovery operation by water flooding. The compositions of this invention can also be used in such water disposal wells thus providing a simple and economical method of solving the corrosion problems encountered in disposing of unwanted water.

Water flood and waste disposal operations are too well known to require further elaboration. In essence, in the present process, the flooding operation is effected in the conventional manner except that the flooding medium contains a minor amount of the inhibitors of the invention, sufficient to prevent corrosion.

While the flooding medium which may be employed in accordance with the present invention contains water or oil field brine and the compounds of this invention, the medium may also contain other materials. For example, the flooding medium may also contain additives such as surface active agents or detergents which aid in wettting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers and the like.

The effective concentration of the corrosion inhibitors of this invention will vary widely depending on the particular composition used and the particular system in which it is used. Concentrations of at least about 5 ppm, such as about 10 to 10,000 ppm, for example about 25 to 5,000 ppm, advantageously about 50 to 1,000 ppm, preferably about 75–250 ppm may be employed. Larger amounts can also be employed such as 1.5–5.0%, although there is generally no commercial advantage in so doing.

For example, since the success of a water flooding operation manifestly depends upon its total cost being less than the value of the additional oil recovered from the oil reservoir, it is quite important to use as little as possible of these compounds consistent with optimum corrosion inhibition. Since these compounds are themselves inexpensive and are used in low concentrations, they enhance the success of a flood operation by lowering the cost thereof.

By varying the constituents of the composition, the compounds of this invention can be made more oil soluble or more water soluble, depending on whether the composition is to be employed in oil or water systems or mixed oil/water systems.

What is claimed is:

1. Method of inhibiting corrosion of ferrous metals in oil and gas well drilling and production systems comprising adding to said systems an effective corrosion inhibiting amount of a composition comprising a solution, dispersion or emulsion of a compound selected from the group consisting of compounds represented by the formula

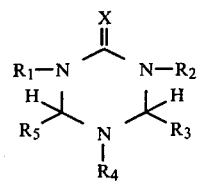

wherein X represents oxygen or sulfur, $R_1$ and $R_2$ are the same or different and $R_3$ and $R_5$ are the same and represent hydrogen, alkyl, cycloalkyl, aryl, aralkyl, alkaryl and heterocyclyl, $R_4$ represents an organic radical, and the acid salts and quaternary ammonium salts thereof.

2. Method of claim 1 wherein X represents oxygen.
3. Method of claim 1 wherein $R_1$, $R_2$, $R_3$ and $R_5$ represent hydrogen and $R_4$ represents alkyl.
4. Method of claim 1 wherein $R_1$, $R_2$, $R_3$ and $R_5$ represent hydrogen and $R_4$ represents hydroxyalkyl.
5. Method of claim 1 wherein X represents sulfur.
6. Method of claim 5 wherein $R_1$, $R_2$, $R_3$ and $R_5$ represent hydrogen and $R_4$ represents alkyl.
7. Method of claim 5 wherein $R_1$, $R_2$, $R_3$ and $R_5$ represent hydrogen and $R_4$ represents hydroxyalkyl.
8. Method of claim 5 wherein $R_1$, $R_2$, $R_3$ and $R_5$ represent hydrogen and $R_4$ represents an ether.
9. Method of claim 6 wherein said compound is 2,2'bis(1,3,5-triazine-2(1H)thione-5-yl)diethyl amine.
10. Method of claim 6 wherein said compound is 5-(2-octadecyl)-1,3,5,-triazine-2(1H)thione.
11. Method of claim 7 wherein said compound is 5-(2-hydroxyethyl)-1,3,5,-triazine-2(1H)thione.
12. Method of claim 7 wherein said compound is 5-(2-hydroxypropyl)-1,3,5-triazine-2(1H)thione.
13. Method of claim 8 wherein said compound is 5(2-octyl, nonyl, decyl mixed ethers of n-propylamine)-1,3,5-triazine-2(1H)thione.

* * * * *